Dec. 14, 1954

C. W. BLOSSEY 2,697,165

OSCILLATOR COUPLING SYSTEM

Filed Nov. 15, 1949

2 Sheets-Sheet 1

Inventor

Carl W. Blossey

By

Willits, Helwig & Baillio

Attorneys

Inventor
Carl W. Blossey
By Willits, Helwig & Baillio
Attorneys

United States Patent Office 2,697,165

Patented Dec. 14, 1954

2,697,165

OSCILLATOR COUPLING SYSTEM

Carl W. Blossey, Kokomo, Ind., assignor to General Motors Corporation, Detroit, Mich., a corporation of Delaware

Application November 15, 1949, Serial No. 127,487

5 Claims. (Cl. 250—20)

The present invention relates to coupling systems and more particularly to coupling systems of the type used in beat frequency oscillators and converters for superheterodyne radio receivers.

It is sometimes desirable to provide a coupling system in which the degree of coupling is varied as a predetermined function of an independent variable. It is frequently desirable to control the amplitude of an oscillator output signal as its frequency is varied. This latter control may be accomplished by varying the grid bias or the degree of coupling in the oscillator as its frequency is changed. In superheterodyne receivers it is desirable that the receiver be so designed as to have uniform response throughout its frequency range. Certain circuit considerations make this difficult in the normal course of receiver design and therefore it is desirable that the resulting unsatisfactory response curve be compensated automatically as the receiver is tuned throughout its frequency range. This compensation may be accomplished in the present invention by suitably proportioning the coupling in the oscillator to obtain the desired characteristics.

Prior workers in the art have endeavored to solve the above mentioned problems by various devices. Some have used automatic gain control techniques while others have utilized reactive elements, particularly resistance-capacitance networks to obtain the desired compensation and/or coupling. These attempts have resulted either in added expense to the receiver, or in unsatisfactory compensation due to the inherent limitation of the fixed elements. Many of the early radio receivers used variable couplings which were adjusted simultaneously with the tuning condensers. These are of course quite expensive.

It is therefore an object of the present invention to provide an electromagnetic coupling system in which the degree of coupling may be made to vary as a predetermined function of an independent variable.

It is a further object of the present invention to provide a coupling system with a movable iron core in which the degree of coupling may be made to vary as a predetermined function of the position of the core.

It is another object of the present invention to provide an oscillator circuit in which the degree of coupling and/or the oscillator grid bias is made to vary automatically as the oscillator is tuned throughout its frequency band to thereby obtain a desired output signal amplitude characteristic.

It is a further object of the present invention to provide a converter network for use in heterodyning circuits, particularly superheterodyne receivers, so that the total gain of the amplifiers associated with the converter plus the gain of the converter may either be made substantially constant or varied as a predetermined function of the variable frequency being amplified.

It is a further object of the present invention to provide a feedback coupling network for a beat frequency oscillator, the degree of coupling of which may be varied to thereby produce a negative grid bias for the oscillator and/or associated amplifiers of such magnitude as to control the amplification in a predetermined manner.

It is a further object of the present invention to control the degeneration in the cathode circuit of a pentagrid converter as the oscillator section is tuned through a range of frequencies to thereby obtain a desired response curve.

Other objects of this invention will become apparent upon reading the specification and inspection of the drawings and will be particularly pointed out in the claims.

Referring to the figures in the drawings, Figure 1 shows the assembled coupling coil arrangement.

It will be noted as the description of this invention proceeds that the self-induction of the individual coupling coils and the mutual inductance between these two coils is varied, due to the peculiarity of the windings, as the core is inserted in the coil. This variation in inductance is utilized in the oscillator and converter circuits to obtain a predetermined coupling, degeneration, and negative grid bias.

Figure 1:
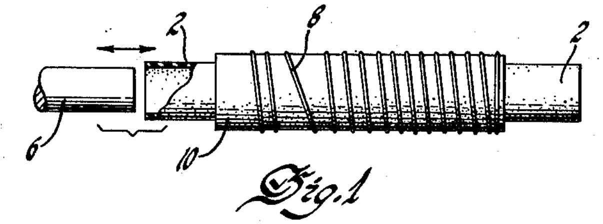
Figure 2:
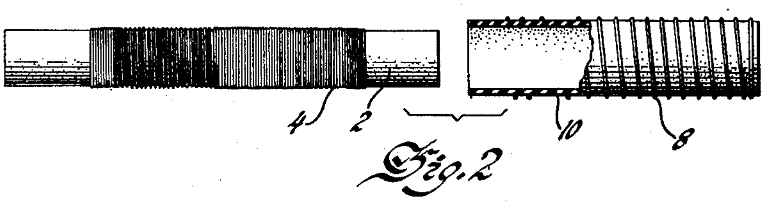
Figure 2 is an exploded view of Figure 1.

Referring more particularly to Figures 1 and 2, the specific construction of the preferred form of the coupling system utilized in the present invention is illustrated. This coupling system consists of a primary coil 8 and a secondary coil 4 concentrically wound. The coil 4 is wound on a cylindrical nonmagnetic coil form 2. The coil 4 may be either uniformly or nonuniformly wound as is necessary to get the proper inductance variation as the core 6 is reciprocated therein. The preferred form of this coil consists of 122 turns of number 36 copper wire spaced on the coil form 2 from left to right as follows:

| Turns: | Turns per inch |
|---|---|
| First 15 | At 116 |
| Next 4¼ | At 35.1 |
| Next 6½ | At 50 |
| Next 15¼ | At 63 |
| Next 18 | At 80 |
| Next 25½ | At 113 |
| Last 37½ | At 117 |

The primary coil 8 is nonuniformly wound on a cylindrical nonmagnetic coil form 10. The coil form 10 has sufficient internal diameter to permit the coil 4 and its form 2 to be inserted therein and fixed rigidly in place by means of lacquer or other similar material. The coil 8 has suitably spaced windings to obtain the necessary inductance and coupling variations to carry out the provisions of the present invention. In the preferred form however it consists of a 15½ turn coil of number 36 copper wire spaced from left to right on the coil form as follows:

| Turns: | Turns per inch |
|---|---|
| 2 | 20. |
| 1 | 4. |
| 12½ | Starting at 8 and closing uniformly to 21 at the right end of the coil. |

The two coils 4 and 8 are assembled as shown in Figure 1 and so located that the tuning core 6 of magnetic material may be reciprocated within the hollow core member 2.

Figure 3:
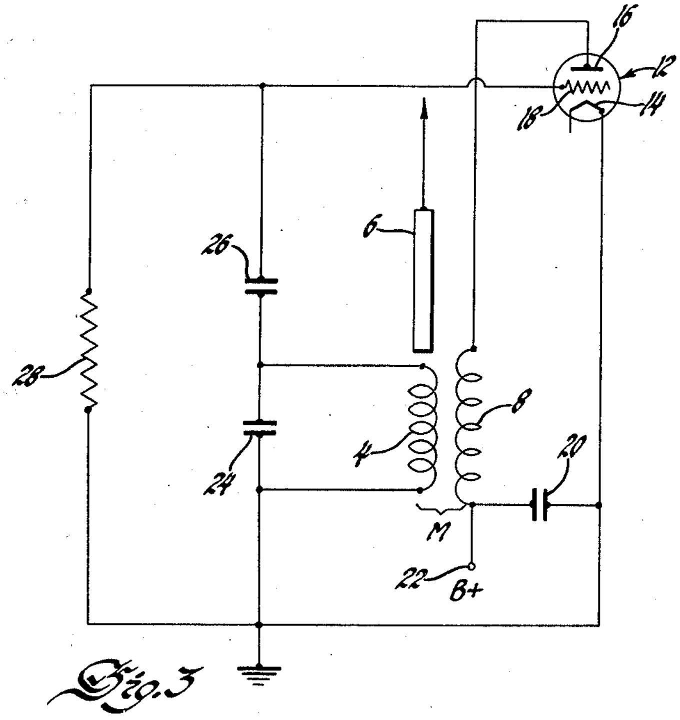
Figure 3 is an oscillator utilizing the present invention.

The coupling system above described may be incorporated in an oscillator circuit of either the grounded plate type or of the grounded cathode type shown in Figure 3. This oscillator consists of a thermionic vacuum tube 12 having a cathode 14, a plate 16 and a grid 18 located therein. The plate circuit of this oscillator contains a primary or feedback coil 8 together with an RF bypass condenser 20 and a DC power supply 22. The grid circuit of the oscillator contains the secondary coil 4 which together with condenser 24 determines the resonant frequency of the oscillator and this frequency may be varied by the reciprocation of the core member 6 within the coils 4 and 8. The grid circuit also contains a grid coupling condenser 26 and a grid leak resistor 28. The amplitude of the signal output of the oscillator, and the magnitude of the oscillator grid bias built up across the resistor 28, are dependent, among other things, upon the self-inductance of each of the coils 4 and 8 and upon the mutual inductance between them. When the core 6 is not in the coils 4 and 8, the self-inductances of the two coils as well as the mutual inductance between them is a minimum. At this point the oscillator is tuned to its maximum frequency as determined by the parallel circuit including coil 4 and condenser 24. As the core 6 is moved into the coils 4 and 8, the values of the above mentioned inductances increase and the coupling increases as well as does the DC grid bias across the resistance 28. As mentioned above, the grid bias for the oscillator is obtained by means of grid leak resistor 28 and grid condenser 26. This method of obtaining grid bias is normally preferred since it makes the oscillator self-starting and self-adjusting at conditions corresponding to good efficiency and also improves the frequency stability. However in special applications the oscillator may be operated with a fixed bias.

Figures 4, 5:
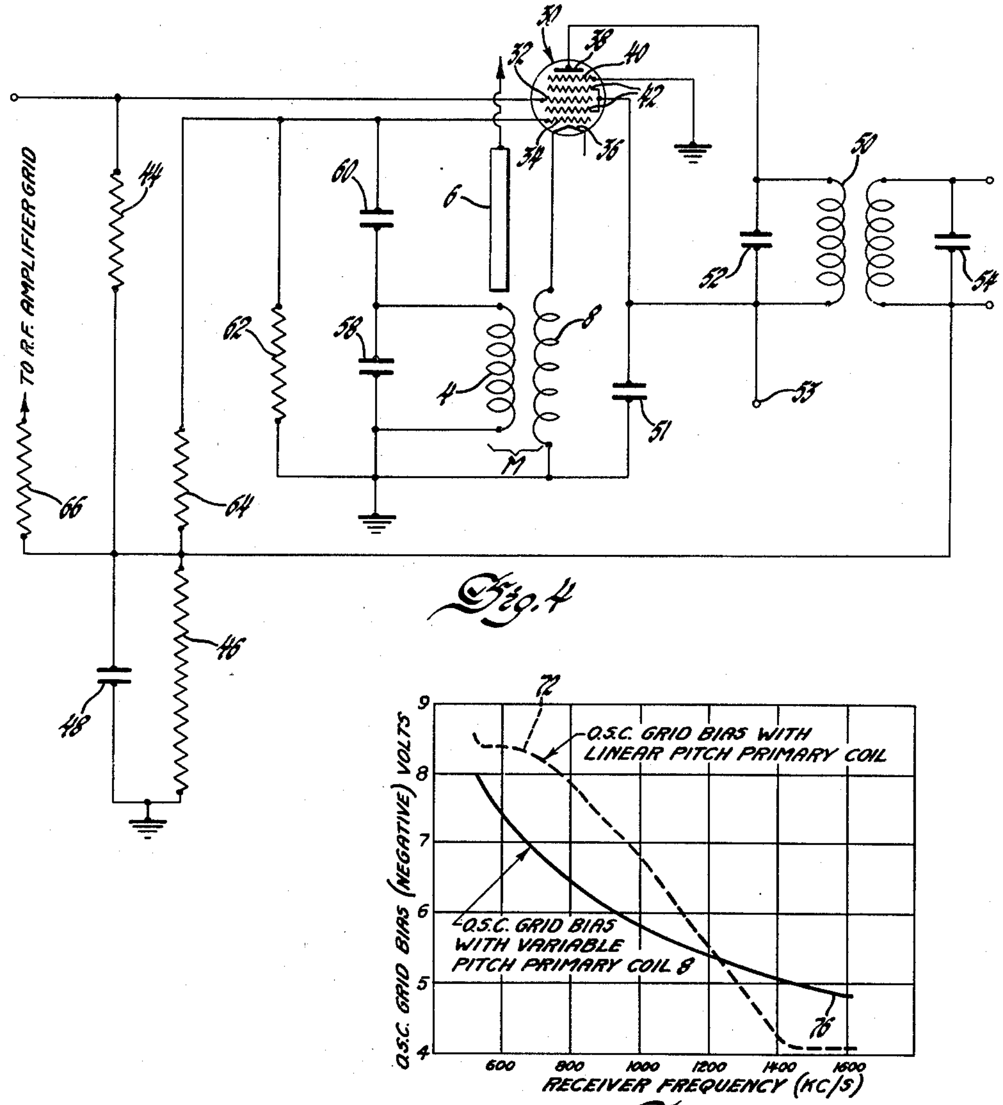
Figure 4 shows part of a superheterodyne receiver circuit utilizing the present invention.
Figure 5 illustrates the oscillator grid bias versus receiver frequency relationship.

When the oscillator is operated under conditions of dynamic grid bias as shown in Figure 3, the grid bias characteristics may be as shown in Figure 5. As noted in Figure 5 this grid bias curve may be altered considerably by suitably proportioning the spacing of the windings of the coil 8. As will be noted by inspection of Figures 1 and 3, the pitch or turns density over the length of the oscillator coil 8 may be varied so that the strength of the oscillation, the voltage across the coil 8, the inductance of this coil, and the oscillator grid bias may, within limits, be made a desired function of frequency or core position. When the inductance of a solenoid coil of variable pitch or turns density is varied by the axial movement of a powdered iron core such as core 6, the rate of inductance change per unit axial movement of the core is less than average as the end of the core passes through a section of the coil having fewer turns per inch than the average turns density of the coil. Conversely as the end of the core passes through a section having a greater turns density than average, the rate of inductance change is greater than average. Therefore by suitable variation of the turns density of coil 8 or of coils 8 and 4, the ratio of the self-inductance of 8 to the self-inductance of 4, the mutual inductance between the coils 8 and 4, and/or the coefficient of coupling therebetween may be made, within limits, some desired function of core position or frequency. Thus by the use of variable pitch primary coil 8, the voltage output of the oscillator and the DC dynamic grid bias thereof may be used either singly or in combination to compensate the overall gain of a radio receiver or modify or control the gain of associated amplifiers, within limits, as some desired function of core position or frequency. This same circuit may be incorporated in the oscillator section of a converter if so desired.

In a pentagrid converter the conversion gain normally increases to a maximum and then decreasese as the oscillator signal strength increases from a low value (in the manner shown in the standard vacuum tube manuals). By use of a variable pitch feedback or primary coil in the oscillator section of a converter circuit tuned by a powdered iron core, a more effective control of the oscillator strength and hence of the conversion gain of the converter stage is permitted than when using linearly wound feedback coils.

The present invention may be incorporated in a pentagrid converter stage of a superheterodyne radio receiver as illustrated in Figure 4. In this figure, 30 is a multigrid thermionic vacuum tube of conventional design and may be of the type commonly known in the art as a pentagrid tube. This tube has control grids 32 and 34, a cathode 36, a plate 38, a suppressor grid 40 and a screen grid 42. The control grid 32 is coupled to a radio frequency amplifier output across a passive element network including resistors 44 and 46, and condenser 48. The output of the converter is connected to succeeding stages of an intermediate frequency amplifier by means of intermediate frequency transformer 50 with its associated condensers 52 and 54. This IF coupling system is of the double tuned type with the primary of the transformer 50 tuned by means of the condenser 52 and its secondary tuned by means of condenser 54. Condenser 51 is a high frequency bypass across the power source 53. The oscillator section of the converter contains a coupling system very similar to that described in connection with Figure 3 having a concentrically wound primary coil 8 and secondary coil 4 with a powdered iron core 6 reciprocable therein. These coils are more particularly described in connection with Figures 1 and 2. A fixed condenser 58 is connected in shunt with the secondary coil 4 to produce therewith a parallel tuned circuit whose resonant frequency is determined by the position of the core 6 in the coils 4 and 8. The condenser 58 corresponds in general with the condenser 24 of Figure 3. Grid coupling condenser 60 in Figure 4 corresponds to grid coupling condenser 26 in Figure 3 and grid biasing resistor 62 corresponds in general with grid biasing resistor 28 in Figure 3. Resistors 64 and 46 provide a feedback voltage dividing network designed to furnish an automatic gain control voltage through resistor 44 to the grid 32 of the pentagrid tube 30 and to grids of preceding and/or following amplifier stages from the dynamic grid bias voltage produced on the grid 34 as a result of the rectifier action between the grid 34 and the cathode 36. Condenser 48 is a filter capacitor while resistors 66 and 44 are decoupling or filter resistors. The amplitude of this voltage is dependent upon the strength of the signal produced on the grid 34 and therefore is dependent upon the degree of coupling between the coils 8 and 4.

By use of a variable pitch feedback coil 8, the negative grid bias produced on the grid 34 and/or the rate of change of this grid bias can be made, within limits, some desired function of oscillator frequency or position of core 6. A portion of this controlled oscillator negative grid bias may, through a voltage divider network including resistors 64 and 46 and condenser 48, be used to control the gain of the converter tube through resistor 44 on the grid of the amplifier section of this tube. In a similar manner the gain of the radio frequency amplifiers preceding the converter may be controlled by a negative grid bias voltage feedback through resistor 66 and/or the gain of a low frequency amplifier following the converter from the voltage dividers 64 and 46 through the secondary of transformer 50.

The inductance of the feedback or primary coil 8 in the cathode circuit of the pentagrid converter shown in Figure 4 causes degeneration or loss in gain at the signal frequency. This degeneration is proportional to the inductive reactance of coil 8. Thus it varies as both the inductance of coil 8 and the frequency of the signal. This degeneration or loss in gain may therefore be broadly controlled by a variable pitch feedback coil.

Figure 6:
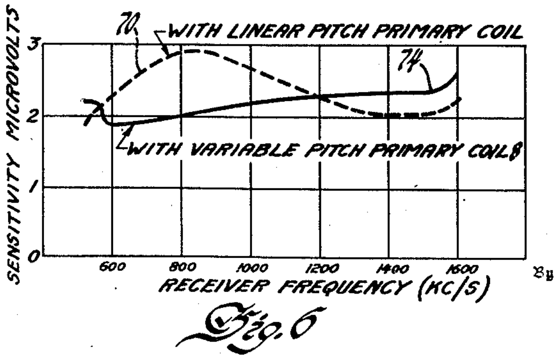
Figure 6 shows receiver sensitivity versus receiver frequency relationship.

In one particular superheterodyne type receiver under test, the gain (or sensitivity) of the tuned radio frequency circuits was greater at the low frequency end of the tuning range than at the high frequency end. This was due in this particular case to a higher circuit Q and higher coil inductance at the low frequency end. The overall sensitivity of this superheterodyne receiver with the linear pitch feedback coil as used in the prior art is shown as 70 in Figure 6. The oscillator grid bias in such a receiver is shown as 72 in Figure 5. It is desired in most cases that the sensitivity of the receiver remain substantially constant over the tuning range. In order to more closely approach such a desired result, a pentagrid converter of the so-called self-excitation type as shown in Figure 4 is used employing a feedback coil 8 with pitch or turns density suitably proportioned throughout its length. With proper nonuniform spacing of the windings on coil 8 as shown in Figure 1, the strength of oscillations, the negative grid bias on the grid 34, the negative feedback voltage to the preceding amplifier grids, and the degeneration due to the inductance of coil 8 is made to vary with the position of the core 6 and the frequency of the oscillator in such a manner that the sensitivity of the superheterodyne receiver is made substantially uniform throughout the frequency range of the tuning circuits. The sensitivity of the receiver using these nonuniformly spaced coil windings is shown as 74 in Figure 6. The resulting negative grid bias on the grid 34 is shown as 76 in Figure 5. It may thus be seen that by suitably spacing the windings on one or both of the coils in the oscillator coupling system, a desired receiver response curve may be obtained. By suitably proportioning these windings, a desired oscillator amplitude versus frequency relationship may be obtained and also a negative DC voltage suitable for gain control is produced.

While certain desirable features of the present invention have been described in connection with the specified applications thereof, it will be apparent to those skilled in the art that the ratio of inductances of the primary and secondary coupled circuits and the mutual inductance between these coils or their coefficient of coupling may be made a desired function of the position of a tuning core inserted within the coils and/or the frequency to which a circuit connected to one or more of these coils is tuned.

It is to be understood also that although the invention has been described with specific reference to a particular embodiment thereof, it is not to be so limited, since changes and alterations therein may be made which are within the full intended scope of this invention as defined by the appended claims.

I claim:

1. A variable frequency signal generator including; a vacuum tube having a cathode, a plate and at least one grid, an electromagnetic coupling system having a primary coil and a secondary coil concentrically wound, said primary coil and said secondary coil connected respectively in circuits with separate elements of said tube, a condenser connected in parallel with one of said coils to form a parallel tuned circuit, a resistance capacitance electrical network connected to one of the coils and to one of the grids of the tube forming a detector circuit producing a negative D. C. voltage on said grid, a core of low reluctance material insertable within said concentrically wound coils, means for inserting said core in said coils to simultaneously vary the coupling therebetween and the resonant frequency of said parallel tuned circuit, the other of said coils having variable spacing between windings throughout the length of the coil to provide a definite variable coupling curve whereby the magnitude of the D. C. voltage produced across said resistance capacitance network and impressed on said grid varies as a predetermined function of the resonant frequency of said parallel tuned circuit.

2. In a superheterodyne radio receiver having a tuned radio frequency amplifier, a beat frequency oscillator including; a vacuum tube having a cathode, a plate and at least one grid, an electromagnetic coupling system having a cylindrical primary coil and a cylindrical secondary coil concentrically wound, said primary coil and said secondary coil connected respectively in circuits with separate elements of said tube, a condenser connected in parallel with one of said coils to form a parallel tuned circuit, a resistance capacitance electrical network connected to one of the coils and to one of the grids of the tube forming a detector circuit producing a negative D. C. voltage on said grid, a core of low reluctance material insertable within said concentrically wound coils, means for inserting said core in said coils to simultaneously vary the coupling therebetween and the resonant frequency of said parallel tuned circuit, the other of said coils being untuned and having variable spacing between windings throughout the length of the coil to provide a definite variable coupling curve whereby the magnitude of the D. C. voltage produced across said resistance capacitance network and impressed on said grid varies as a predetermined function of the resonant frequency of said parallel tuned circuit.

3. In a superheterodyne radio receiver having a tuned radio frequency amplifier, a beat frequency oscillator as claimed in claim 2 in which the D. C. bias produced on the grid of the oscillator section of the pentagrid converter is used to control the amplification factor of an amplifier associated with said converter.

4. In a superheterodyne radio receiver having a tuned radio frequency amplifier, an oscillatory circuit including a vacuum tube having a plate, cathode, and at least one grid, an electromagnetic coupling system having a variable pitch primary coil and a variable pitch secondary coil concentrically mounted, said primary coil being connected to the plate of the tube, a condenser connected across the secondary coil to form a tuned circuit, a core of low reluctance material insertable within the concentric coils, means for inserting said core into said coils to vary the coupling therebetween in a predetermined manner and simultaneously vary the resonant frequency in an independent predetermined manner to provide a variation in the degree of coupling for maintaining output and for tracking with other tuning means.

5. In a superheterodyne radio receiver having a tuned radio frequency amplifier, an oscillator tube having a plate, cathode, and at least one grid, an electromagnetic coupling system including a primary coil and a secondary coil concentrically mounted, both coils having variable pitch windings, said primary coil being connected to said plate, a condenser connected across the secondary coil to form a tuned resonant circuit, a resistance-capacity network connecting the resonant circuit with the grid, and a core of low reluctance material movably mounted for movement into said concentric coils to vary the inductance of the secondary in accordance with a prescribed curve and simultaneously vary the degree of coupling of the two coils in accordance with a second curve as the core is moved to provide tracking and uniform oscillator output.

References Cited in the file of this patent

UNITED STATES PATENTS

| Number | Name | Date |
|---|---|---|
| 1,966,045 | Posthumus et al. | July 10, 1934 |
| 2,072,365 | Grimes | Mar. 2, 1937 |
| 2,190,048 | Sinninger | Feb. 13, 1940 |
| 2,266,670 | Winfield | Dec. 16, 1941 |
| 2,289,670 | McClellan | July 14, 1942 |
| 2,359,684 | Sands | Oct. 3, 1944 |
| 2,486,986 | Sands | Nov. 1, 1949 |
| 2,489,114 | Vladimir | Nov. 22, 1949 |
| 2,496,058 | Mackey | Jan. 31, 1950 |
| 2,525,438 | Wuerfel | Oct. 10, 1950 |
| 2,554,230 | Worcester, Jr. | May 23, 1951 |